Aug. 2, 1949.　　C. A. GILSON　　2,478,096
CALCULATING DEVICE
Filed March 14, 1947
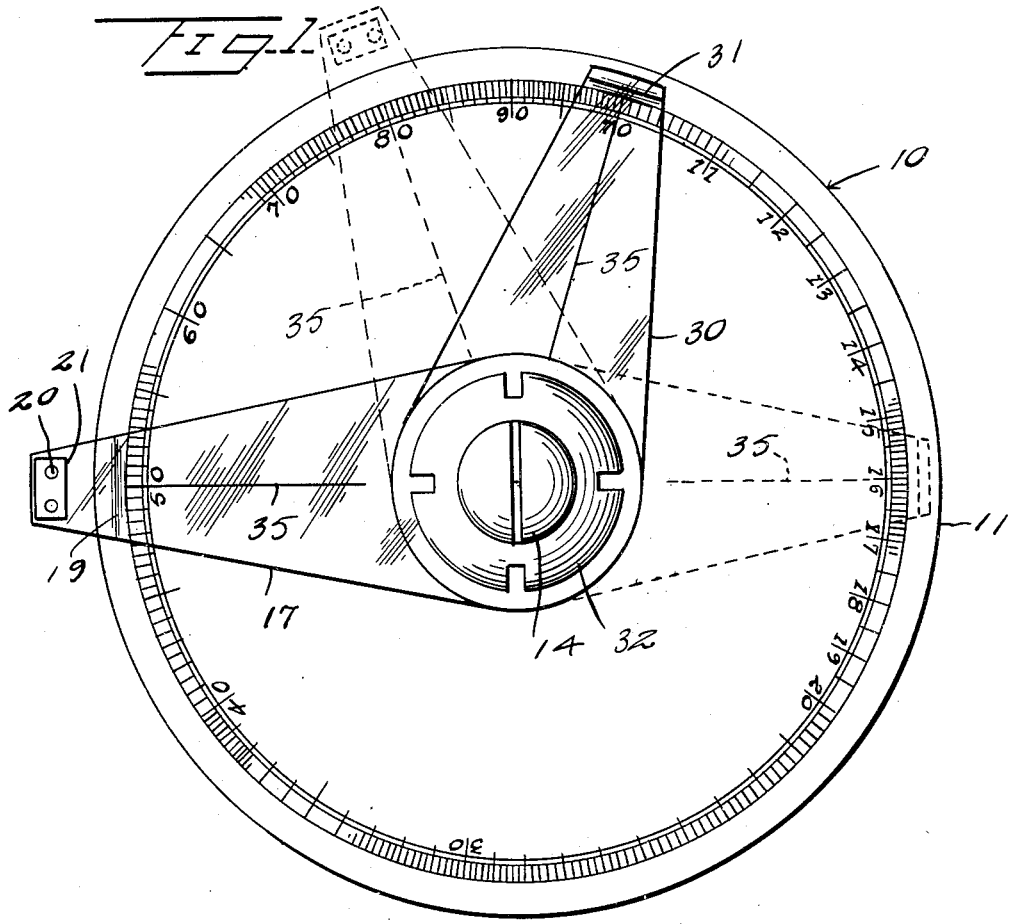
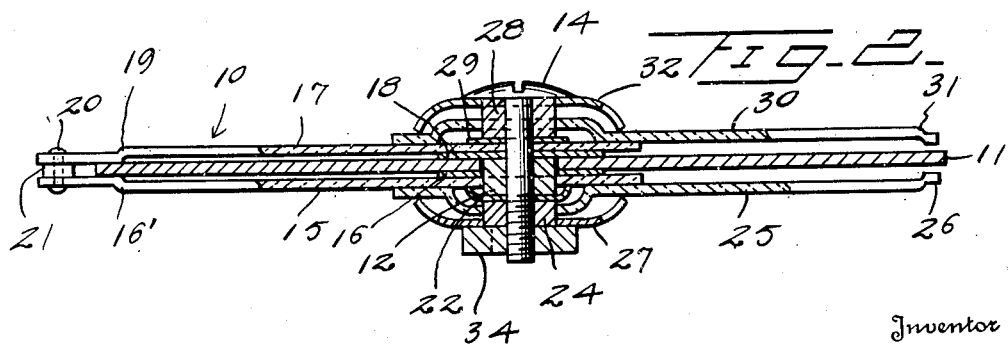
Inventor
C. A. Gilson
By Kimmel & Crowell Attorneys Patented Aug. 2, 1949

2,478,096

UNITED STATES PATENT OFFICE 2,478,096

CALCULATING DEVICE

Clair A. Gilson, Stuart, Fla.

Application March 14, 1947, Serial No. 734,639

2 Claims. (Cl. 235—84)

This invention relates to mechanical calculating devices and is an improvement over Patent No. 1,404,019 dated January 17, 1922.

An object of this invention is to provide a mechanical calculator in the form of a disc having arithmetic scales on the opposite faces and a pair of pivoted arms on each face with the innermost member of each pair fixedly connected together for unitary movement, and the other member of each pair independently adjustable to a selected angular position.

Another object of this invention is to provide a calculator of this kind which may be formed on one face thereof with one kind of arithmetic graduations, and may be provided on the opposite face thereof with another kind of arithmetic graduations, the calculator being provided with pairs of arms movable over the scales or graduations, and the scales or graduations on both sides being so correlated that the setting and adjustment of the arms on one face of the dial will indicate the answer to another problem on the reverse face of the dial.

Still another object of this invention is to provide a calculating device of this kind having a pair of indicating arms on both sides of a graduated disc, one arm of each side being fixed to one arm on the other side, the other arms being free to be rotated selectively independently of or together with the connected arms for transposing calculations from one side of the disc to the other.

Yet another object of this invention is to provide a calculating device of the kind to be hereinafter described, having rotatable indicating arms thereon which are so formed that the arms contact the disc only near the periphery thereof along a space provided for such rubbing contact whereby the rubbing of such arms will not rub off or otherwise deteriorate the indicia on the disc.

A further object of this invention is to provide two indicating arms on opposite sides of a flat graduated dial, the arms being so arranged that either one of the shorter arms may be moved while the two long arms remain stationary and when the long arms are moved, the short arms are moved the same angular distance whereby angular distance can be added or subtracted and the result thereof may be transposed from one side of the dial to the other. By having suitable scales on both sides of the dial, many types of problems may be quickly and accurately solved. Reference is had particularly to computers for use of airplane test pilots where a number of correlated scales may be correlated on opposite sides of the dial, such scales having a common relation, as based on logarithmic progressions or other arithmetic scales.

With the above and other objects in view, my invention consists in the arrangement, combination and details of construction disclosed in the drawings and specification, and then more particularly pointed out in the appended claims.

In the drawings,

Figure 1 is a top plan view of my calculator; and

Figure 2 is a vertical section therethrough.

Referring to the drawings, the numeral 10 designates generally a calculator constructed according to an embodiment of my invention. The calculator 10 comprises a base plate or dial 11 having one or more series of scales annularly disposed thereon. As the most frequently occurring problems in test work are those which require calculations other than simple addition or subtraction, logarithmic scales are the most used in multiplication and division problems may be solved, so in the drawings I have shown a logarithmic scale on the dial 11, although other scales, including multiple logarithmic scales may be used without digressing from the spirit of this invention.

A bushing 12 is rotatably mounted in the center of the dial 11 and scale or scales thereon and a bolt 14 engages loosely through the bushing or bearing 12. The bushing 12 is so disposed that the upper edge thereof is flush with the upper surface of the dial 11 and the lower end of the bushing 12 extends downwardly from the lower surface.

An outwardly extending radial arm 15 is carried by the bushing 12 and is spaced from the disc 11 on the lower side by a washer or spacer 16 loose about the bushing 12. The arm 15 is formed at its outer end with an upwardly extending detent or joggle 16 for engaging the disc 11 outwardly of the scales thereon whereby the arm 15 is spaced from the dial 11 along its length so that continued use of this device 10 will not wear off the graduation marks on the dial 11. The arm 15 then is terminated beyond the dial 11.

A similar arm 17 is fastened to the bolt 14 above the dial 11 and spaced thereabove by a washer 18 loose about the bolt 14. The arm 17 extends outwardly and is spaced at its outer end from the dial 11 by a detent 19 extending downwardly opposite from the joggle 16, and the arm 17 extends beyond the dial 11 where it is fastened to the extending arm 15 by bolts or rivets 20 or other suitable fastening means, and a spacer 21 is fixed between the extending portion of the arms 15 and 17, the spacer 21 being substantially the same thickness as the dial 11 to prevent the arms 15 and 17 from clamping the dial 11 therebetween.

A concavo-convex spring washer 22 is loose about the bolt 14 below the bushing 12, having the concave side upward whereby the edges of the spring 22 may press upwardly against the bottom side of the lower long arm 15.

A lower bushing 24 loose about the bolt 14 is carried thereby below the bushing 12 and an outwardly extending short arm 25 is secured thereon, being spaced downwardly from the spring washer 22. The arm 25 engages the lower side of the arm 15 and is terminated short of the edge of the dial 11 with an upwardly extending detent 26 spaced from the disc 11 whereby the arm 25 may be rotated over the arm 15 upon occasion. The concavo-convex spring washer 27, loose about the lower end of the bushing 24 presses upwardly against the arm 25, the edges of the spring 27 engaging the lower side thereof.

An upper bushing or bearing 28 loose on the bolt 14 is spaced above the arm 17 by a washer 29. The upper short indicating arm 30 extends outwardly from the bushing 28 in a manner opposite from the lower arm 25 and is formed with a detent 31 at its outer end similar to the detent 26. The spring washer 32 similar to the washer 27 is carried about the upper end of the bushing 28 and the edges of the lower concave side press the arm 30 inwardly of the device 10. A nut 34 on the lower end of the bolt 14 holds the assembly together and tightening the nut 34 increases the tension of the spring washers 22, 27 and 32 on their respective indicating arms.

Each of the arms is provided with a radial index line 35 which is preferably scribed on the surface of the arms which are preferably made of transparent plastic material so the graduation on the metal disc 11 may be readily viewed therethrough.

By the arrangement as above described, the short arms 25 and 30 are free to turn about the pin or bolt 14 independently of each other and independently of the long arms 15 and 17 whereas movement of the connected arms 15 and 17 effects a corresponding angular movement of the arms 25 and 30 from their independently selected position relative to the arms 15 and 17.

Using a logarithmic scale on the dial 11, multiplication problems are readily solved on either or both sides of the dial by the proper movement of the arms.

A typical multiplication problem is indicated in Figure 1, the object being to multiply 5×16. The long arms 17 and 15 are positioned so that the index line 35 registers with the multiplier 5, and one short arm as 30 is placed so the index line 35 registers with the index or mark 10 on the log scale, as shown in full lines. The long arm 17 is then rotated until the index 35 of the arm 30 registers with the multiplicant 16, thereby rotating the short arms 30 and 17 a like angular distance about the scale, whereby the index 35 on the long arm 17 will indicate the product, or 80, shown in dotted lines. Division is performed in the reverse manner, similar to conventional slide rule procedure, as proportions and other slide rule calculations.

However, as in aircraft flight calculations, several products are desired nearly simultaneously by the pilot or navigator and a similar multiplier is used for both problems. By using a device of this kind both products may be found with but a single movement. As an example, fuel consumption for a definite period of time and distance over the ground towards a base. Using round numbers for convenience, after 5 hours of flight in a plane burning 60 gallons of fuel an hour and travelling at a ground speed of 120 miles per hour, the pilot can determine the total gas consumption and distance by a single movement of the device. The arms 17 and 15 are set with the lines 35 registering with the index 10 on both the upper and lower scales. For calculating fuel consumption on the upper scale, the short arm 30 is placed with its index line over the mark 60, and for determining the distance covered on the lower scale, the short arm 25 is placed with its index line in registry with the mark 12. Then by rotating the long connected arms 15 and 17 until the index line registers with the numeral 5 on both the upper and lower scales, at the same time, both products are indicated by the short arms 30 and 25 respectively, each moving a similar angular distance, about 107 degrees, so that the arm 30 indicates 300 gallons of fuel consumed, and the arm 25 indicates 600 miles, distance covered. Similar correlated problems may be solved in much the same manner simultaneously, thus reducing considerably the time and effort required by previous slide rule arrangements, such rapid calculating means being of considerable aid in the present high speed airplanes wherein seconds lost in calculations result in excessive loss of fuel and distance when a correction or change of the flight must be made as a result of such calculations.

I do not mean to confine myself to the exact details of construction herein disclosed, but claim all variations falling within the purview of the appended claims.

What I claim is:

1. A calculating device of the kind described comprising an annular flat dial having circular scales thereon, a central bushing loose in the center of said dial, a bolt rotatable in said bushing, a pair of indicating arms on opposite sides of said dial extending radially beyond the peripheral edge thereof, means connecting said arms together beyond said dial, one of said arms being fixed to said bushing, the other of said arms being fixed to said bolt, a washer spacing said arms from said dial at the center thereof, a pair of bushings on said bolt on opposite sides of said central bushing, a second pair of indicating arms, each of said latter arms fixed to one of said latter bushings, a washer between one of said latter bushings and said central bushing, a concavo-convex spring washer between the other of said latter bushings and said central bushing frictionally biasing one of said first pair of arms in engagement with said dial, and a pair of outer concavo-convex spring washers about said latter bushings biasing said latter pair of arms in engagement with said first pair of arms whereby all of said arms may be rotated simultaneously relative to said dial.

2. A calculating device of the kind described comprising an annular flat dial having circular scales thereon, a central bushing loose in the center of said dial, a bolt rotatable in said bushing, a pair of indicating arms on opposite sides of said dial extending radially beyond the peripheral edge thereof, means connecting said arms together beyond said dial, one of said arms being fixed to said bushing, the other of said arms being fixed to said bolt, a washer spacing said arms from said dial at the center thereof, a pair of bushings on said bolt on opposite sides of said central bushing, a second pair of indicating arms, each of said latter arms fixed to one of said latter bushings, a washer between one of said latter bushings and said central bushing, a concavo-convex spring washer between the other of said latter bushings and said central bushing frictionally biasing one of said first pair of arms in engagement with said dial, a pair of outer concavo-convex spring washers about said latter bushings biasing said latter pair of arms in engagement with said first pair of arms whereby all of said arms may be rotated simultaneously relative to said dial, and an outwardly offset inner end on said latter arms spaced from said first arms and held in engagement therewith at the periphery of said outer spring washers.

CLAIR A. GILSON.

REFERENCES CITED

The following references are of record in the file of this patent:

UNITED STATES PATENTS

| Number | Name | Date |
|---|---|---|
| 1,042,360 | Maguire | Oct. 22, 1912 |
| 1,404,019 | Gilson | Jan. 17, 1922 |
| 1,868,816 | Dempster | July 26, 1932 |